United States Patent [19]

Vasseur

[11] 3,715,478

[45] Feb. 6, 1973

[54] SECRECY FACSIMILE SYSTEM

[75] Inventor: Jean-Pierre Vasseur, Paris, France

[73] Assignee: CSF-Compagnie Generale de Telegraphie Sans Fil

[22] Filed: July 31, 1970

[21] Appl. No.: 60,159

Related U.S. Application Data

[63] Continuation of Ser. No. 552,194, May 23, 1966, abandoned.

[52] U.S. Cl. ....................178/5.1

[51] Int. Cl. ....................H04n 1/44

[58] Field of Search....178/69.5, 69.5 TV, 7.1, 6.6 R, 178/5.1

[56] References Cited

UNITED STATES PATENTS 3,116,363 12/1963 Doundoulakis ....................178/5.1

3,384,705 5/1968 Rosen ....................178/5.1

2,973,406 2/1961 Druz ....................178/5.1

2,912,486 11/1959 Shanahan ....................178/5.1

*Primary Examiner*—Malcolm F. Hubler

*Attorney*—Cushman, Darby & Cushman

[57] ABSTRACT

A system for secret communication is intended for transmitting successive sequences of *n* information digits, each sequence being separated from the following one by predetermined synchronization digits. The information digits are ciphered before the transmission, and the synchronization digits are transmitted in clear. The synchronization digits are used for synchronizing the ciphering at the transmission, and the deciphering at the reception.

5 Claims, 12 Drawing Figures

SECRECY FACSIMILE SYSTEM

This is a continuation of application Ser. No. 552,194, filed May 23, 1966, now abandoned.

The present invention relates to arrangements for transmitting ciphered messages consisting of cyclically repeated sequences during which the information is transmitted and of dead time signal sequences serving as references, these sequences having respective fixed durations.

Such is, for example, the case in television where each line sequence is separated from the following one by a synchronizing signal. In the disclosure of the term "code" designates a set of arbitrary symbols used to represent information in another system of symbols for characters; the term "cipher" designates a manner of secret writing, that substitutes other letters or symbols, for the letters or symbols intended. When such messages are ciphered, the ciphering and deciphering operations must be synchronized, since one needs to be sure that the message which is being deciphered in accordance with a given method is the same which has been ciphered in accordance with the same method.

For example, if, for the ciphering a succession of key signals is added to the signals to be ciphered, one must be sure that the key signal subtracted for the deciphering purposes is the same as the key signal which has been added for the ciphering.

According to the invention there is provided a ciphering arrangement for transmitting a message made of successive sequences of n information digits each sequence being separated from the following one by p predetermined synchronization digits, comprising means for ciphering said information digits to obtain ciphered digit sequences and means for transmitting sequentially said sequences of ciphered digits and in clear i.e. unciphered said synchronization digits, n and p being integers.

For a better understanding of the invention and to show how the same may be carried into effect reference will be made to the drawings accompanying the following description and in which.

Figures 1, 2, 3:
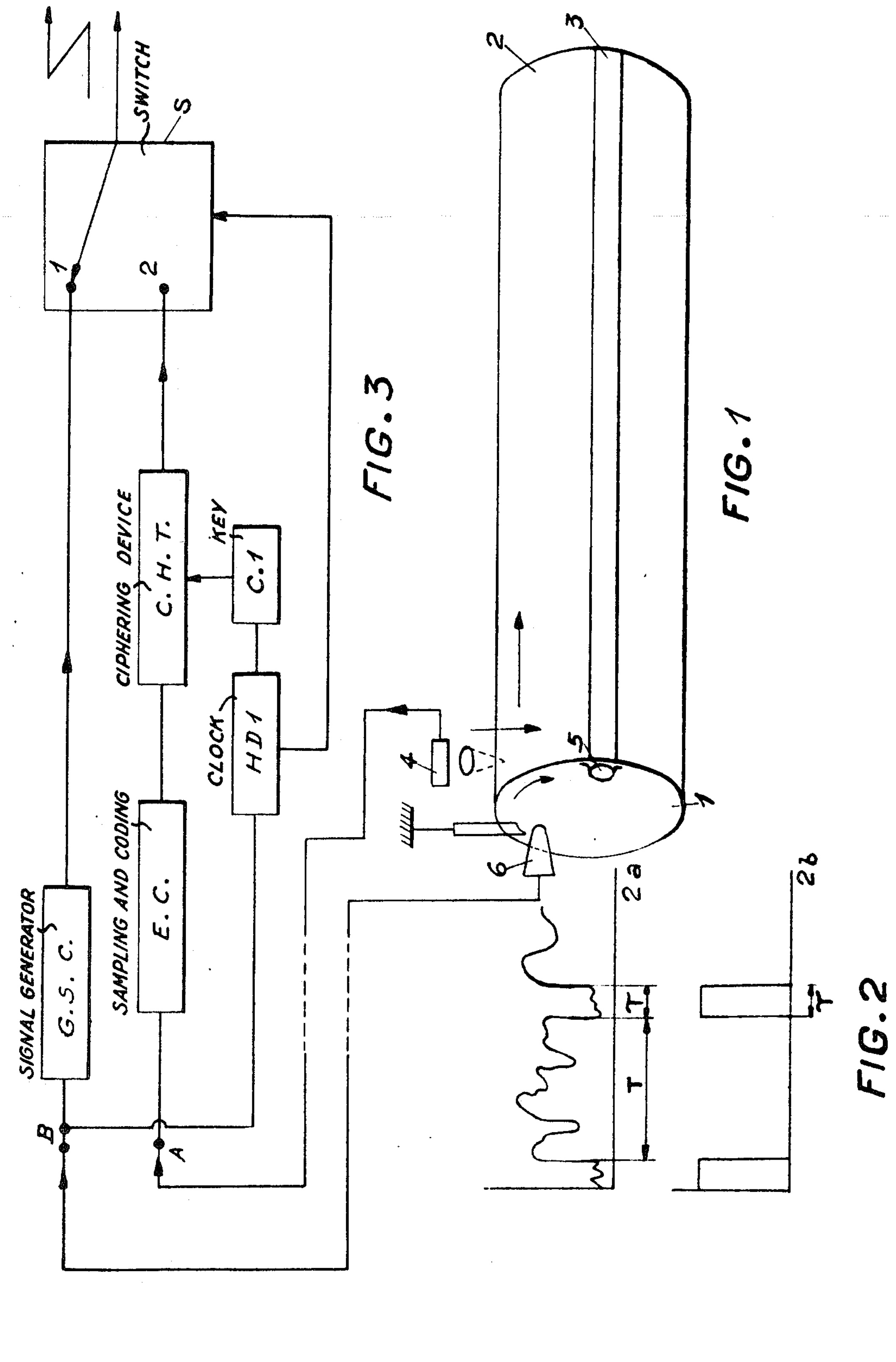
FIG. 1 shows diagrammatically a device for facsimile transmission.
FIG. 2 shows the form of signals obtained at the output of the arrangement of FIG. 1.
FIGS. 3 and 4 show, respectively, transmission and receiving systems according to the invention.

FIG. 1 shows an apparatus for facsimile transmission. This apparatus comprises a drum 1 over which is wound a piece of paper 2, fixed to the drum by means of a clip 3, as known per se. A photoelectric cell 4 moves along a generatrix of the cylinder 1 to analyze a line of the paper. The drum rotates about its axis at a speed of 2 to 3 revolutions per second; the cell advances slowly and scans successive lines on the paper. The transmitted signals are a function of the brightness of each point of the picture.

The receiver uses a similar arrangement, in which the cell is replaced by a pen, controlled by an electromagnet which receives a current, which is proportional to the current transmitted by the cell. The pen thus inscribes on the paper a reproduction of the transmitted picture.

According to a feature of the invention, the transmitter transmits a synchronizing signal at the moment the cell passes the fixing clip, i.e., a point where no picture is to be transmitted. To this effect, a projection 5 is applied to a contact 6. The signals transmitted in this manner are added to the signals coming from the cell.

A set of sequential signals is thus obtained, such as that shown in FIG. 2. During a time interval T (FIG. 2*a*), one signal sequence is transmitted, this sequence translating the brightness of the various points, and each of these sequences is followed by a signal with the duration $\zeta$ (FIG. 2*b*), the so-called "clip signal."

The problem arises of ciphering such signals during the transmission and assuring their deciphering during the reception.

According to the invention, the diagram of FIG. 3 is used for the transmission.

A characteristic signal generator GSC, which is triggered by the output B of the contact 6 supplies a characteristic pulse sequence with the duration $\zeta$, during each passage of the clip in front of the cell. This signal sentence is transmitted to the input 1 of a switch C which transmits it in clear to the transmitter, not shown. This signal sequence has a characteristic structure, whereby it can be reliably identified. For example, the sequence is 010011000111. Its duration is long enough to assure that it is not reproduced accidentally by the ciphered signals.

The output A of the cell 4 is connected to a sampling and coding to a sampling and ciphering arrangement E C, where the signals are sampled and quantized. The output of the arrangement E C is connected to an arrangement CHT, where the signals are enciphered for example by adding signals from the key generator C.1. This generator may be, for example, of the type disclosed in the U.S. Pat. No. 3,170,033.

The operation of the key C.1. is controlled by a clock HD1 , which is started by the signal coming from the output B. With each signal coming from B, the clock HD1 causes the key generator C.1. to advance by N steps, i.e. causes it to generate N successive signals. This number substantially corresponds to the number of points to be transmitted per line.

At the instant of starting the ciphering system, the clock HD1 supplies a signal to the switch C, which moves into the position 2 and thus connects the output of the ciphering device CHT to the transmission stages.

The operation of the assembly will become apparent from the following explanation.

Figure 5:
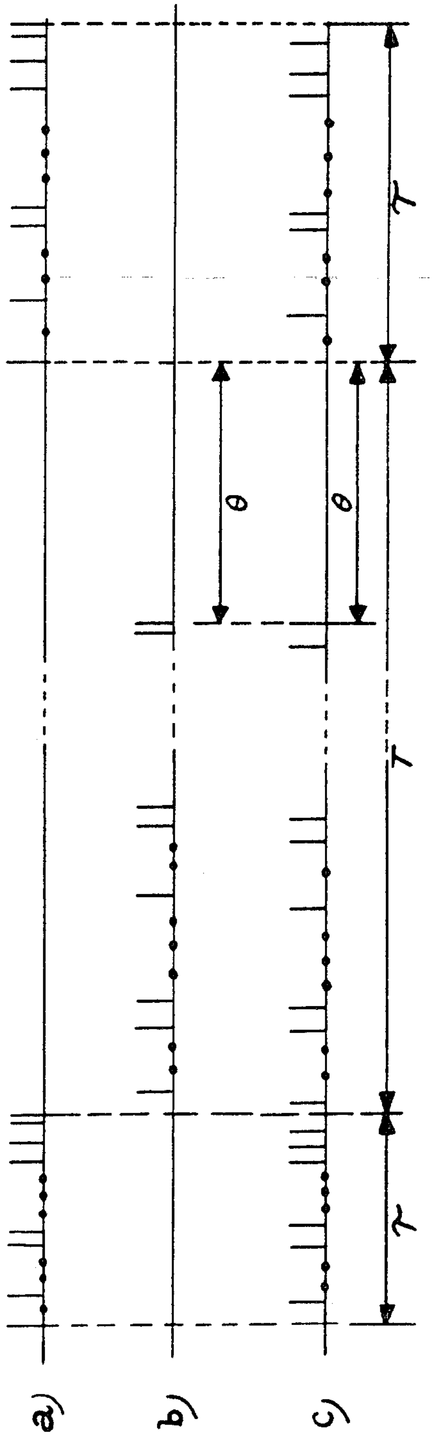
FIGS. 5 to 7 are explanatory graphs.

During the operation of the arrangement GSC, the switch S is in the position 1. The characteristic sequence, shown in FIG. 5a and whose duration is $\zeta$, thus produced, is transmitted in clear. It is assumed that the transmission takes place in the binary code and, by way of example, the characteristic sequence is 010011000111. After the transmission of this signal, the switch C, which is actuated by the clock HD1, moves into the position 2. The signals issued from the photocell 4 are transformed into binary digital signals by the arrangement E C. These signals are ciphered in the arrangement CHT, for example, by addition of the signals coming from the key C.1. A sequence of the duration T, such as that of FIG. 5*b* is obtained in this manner. The signal at the output of the switch C, is, as shown in FIG. 5*c*, the result of the superposition of the signals 5a and 5b. Each sequence of signals 5b contains the N key pulses, each sequence of signals 5*c*, the same number of pulses plus those of the characteristic sequence. This number N is so chosen that the transmission time of the information is slightly less than T. Thus, a dead time 0 separates the end of one sequence and the start of a clip passage signal. After counting the number of pulses, in the characteristic sequence the clock resets the contact into position 1.

Figure 4:
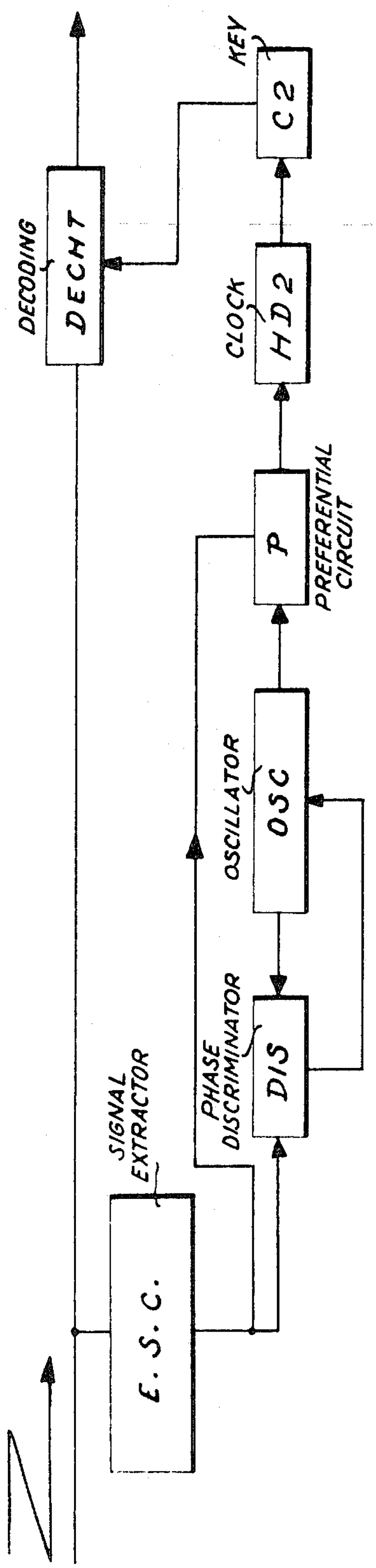

At the receiver end, a system as shown in FIG. 4 is used. It comprises an extractor ESC, which identifies and removes the characteristic signal sequence, and derives therefrom a reference signal having a perfectly defined period and shape. The ciphered picture signals are fed to a deciphering arrangement DECHT, which is connected to the key C2. This key supplies the signals which must be combined to the ciphered signals for restoring the clear signals. Of course, the signals of the keys C1 in the transmission and C2 in the reception must be perfectly synchronized, so that the suitable combination in the reception corresponds to each combination in the transmission. Otherwise, the signal will not be correctly restored.

A local oscillator OSC having the frequency of the reference signals controls a clock $HD_2$ which synchronizes the key C2. This oscillator is connected to the input of a phase discriminator DIS, whose other input receives the signals coming from signal extractor ESC.

The phase discriminator controls the oscillator OSC and assures the synchronization between the pulses generated by the oscillator OSC and the reference signals.

Moreover, the clock $HD_2$ may be triggered directly by the reference signal.

To this end, the reference signal from signal extractor ESC and the synchronizing signals from oscillator OSC, which coincide in time if the communication link operates in a correct manner, are passed to the start input of the clock $HD_2$ through a preferential circuit P having the following object : it transmits to the clock $HD_2$ the reference signal if this latter signal appears at the end of the clock cycle. In the other cases, it transmits the signal coming from oscillator OSC.

The normal reception of a clip passage signal starts the clock $HD_2$, giving rise to a sequence of N pulses, N being the number defined above. These pulses advance the key C2 through N steps and produce the deciphered of the corresponding ciphered sequence. At the end of the cycle of N pulses, the clock $HD_2$ waits for the clip passage signal to start a new cycle.

If the next clip passage signal is not received or received too badly for being correctly detected, the oscillator OSC produces a signal at the moment at which the absent clip passage signal should have occurred. This signal starts the clock $HD_2$. The receiver key C2 continues to advance at the same time as the key C1, and is triggered correctly by the first clip passage signal which is correctly received.

The following figures show how the arrangement according to the invention may be used for coding television pictures.

Figure 6:
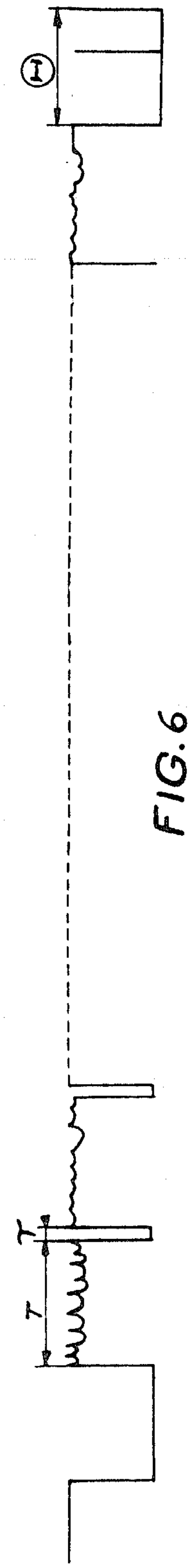
Figure 7:
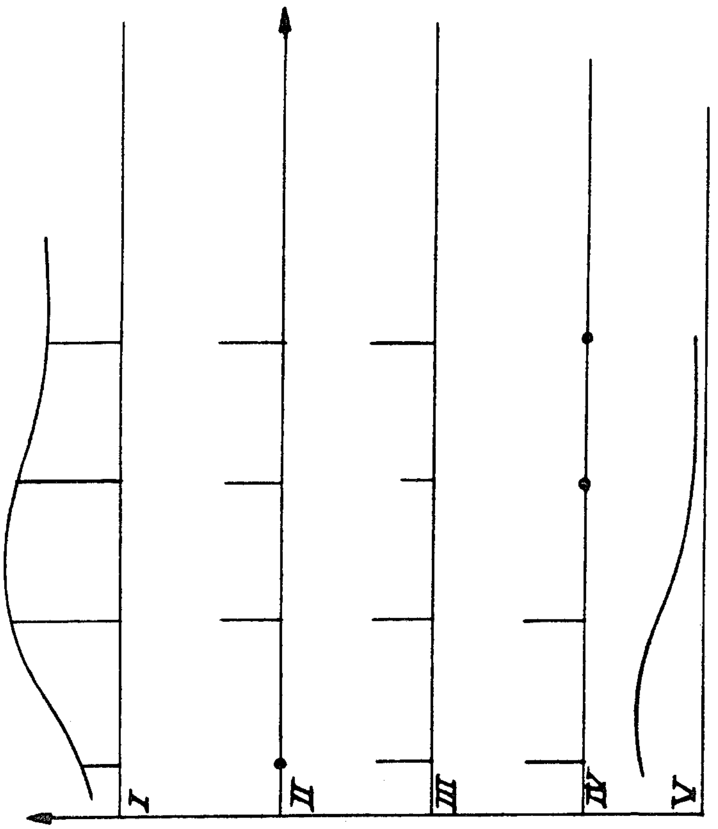

The FIG. 6 shows a sequence of television signals as a function of the time, the modulation being assumed to be positive. It is known that these signals build up line sequences, which in turn build up frame sequences.

Each line sequence with the duration T is separated from the next one by a line synchronizing signal having the duration $\zeta$. N line sequences form one field sequence, i.e. one vertical scanning period separated from the next field sequence by a field synchronizing signal with a duration $\theta$ equal to at least 10 $\zeta$.

For ciphering such an information sequence, the invention provides the following process :

The video signal is ciphered in each line point by point by means of a key as described above. In each line, the key advances through P steps and rests then immobile until the synchronizing signal of the next line, which starts it again; it ciphers P points and then stops again.

After ciphering N picture lines, the key stops and does not start until after the end of the frame synchronizing signal which issues a new starting order. For each picture, the key advances therefore NP points.

The ciphering is made according to a method similar to that described above.

FIG. $7_I$ shows the video signal; FIG. $7_{II}$ shows the same signal once it has been quantized for example to a four level code; FIG. $7_{III}$ shows the key signal; FIG. $7_{IV}$ shows the ciphered signal. The ciphered signal is for example the sum modulo 4 of the key signal and of the quantized signal.

However, the transmission of quantized signals as described above, increases the passband owing to the transmission of useless information concerning the shape and recurrence of the sampled pulses. In order to avoid the transmission of this information, it suffices to pass the signal of FIG. $7_{IV}$, through a filter centered in the signal band. This yields the signal of FIG. $7_V$, which is the envelope of the preceding signal and which is transmitted by the video stages.

Figure 8:
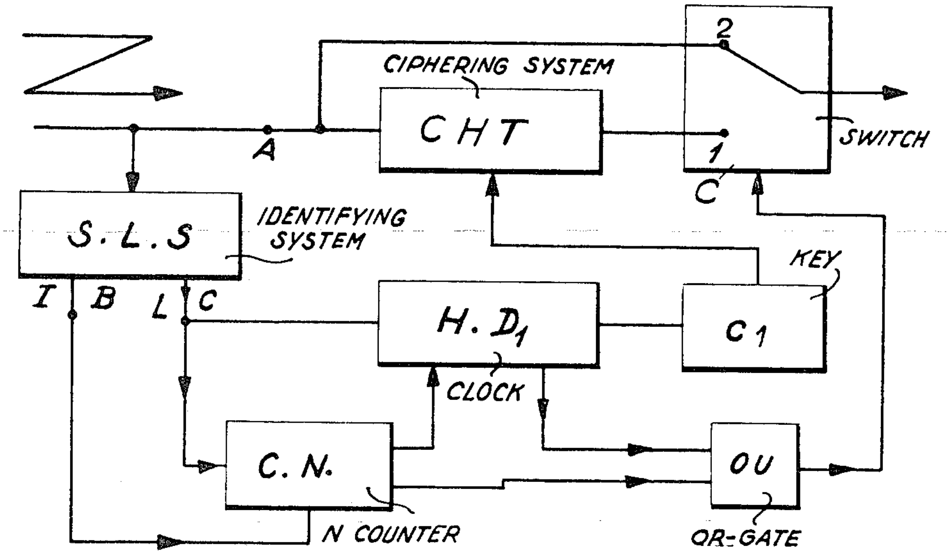
FIG. 8 shows a diagram of a transmission system for television signals.

The ciphering device for the transmission is shown in FIG. 8 as well as for the reception.

The signal to be ciphered arrives at the input of a device SLS which extracts therefrom the field and line synchronizing signals. These signals appear respectively at the outputs I and L. At A are found the signals to be ciphered, which are applied to the ciphering device CHT, which is connected to the key C1, controlled by the clock $HD_1$, connected in turn to the output L (line synchronizing signals).

The output I (field synchronizing signals) is connected to a counter CN which counts the line signals and which, once it has counted N lines, i.e., the number of lines corresponding to one frame, stops and inhibits the operation of the clock $HD_1$. The counter and the clock are connected to the two inputs of an OR-circuit OU whose output controls a switch S with two inputs. At its input 2, it receives the clear signals and at its input 1 the ciphered signals. The output of the switch is connected to the transmission system. The operation of the assembly is as follows :

At the arrival of a field synchronizing signal at the output I, the counter CN is reset to zero and the clock $HD_1$ is no longer inhibited. It is triggered by a line synchronizing signal appearing at the output L. The key C1 is triggered and advances by P steps. The ciphering takes place. The switch is in the position 1 and ciphered signals are transmitted. At the end of the cycle, after the advance through P steps, a pulse appears at the output of the clock. This pulse places the switch into the position 2 through the OR-circuit OU. The signal formed by the sync pulse of the line synchronization passes thus in clear. This signal initiates the process again, the clock $HD_1$ receives a new pulse from output L, resets the switch into position 1 through the OR-circuit and effects a new cycle of P steps.

When the counter has counted N line signals, it stops the clock $HD_1$ and sets switch into position 2, in order to transmit in clear the frame synchronization signal. The latter restarts the process of the next field.

Figure 9:
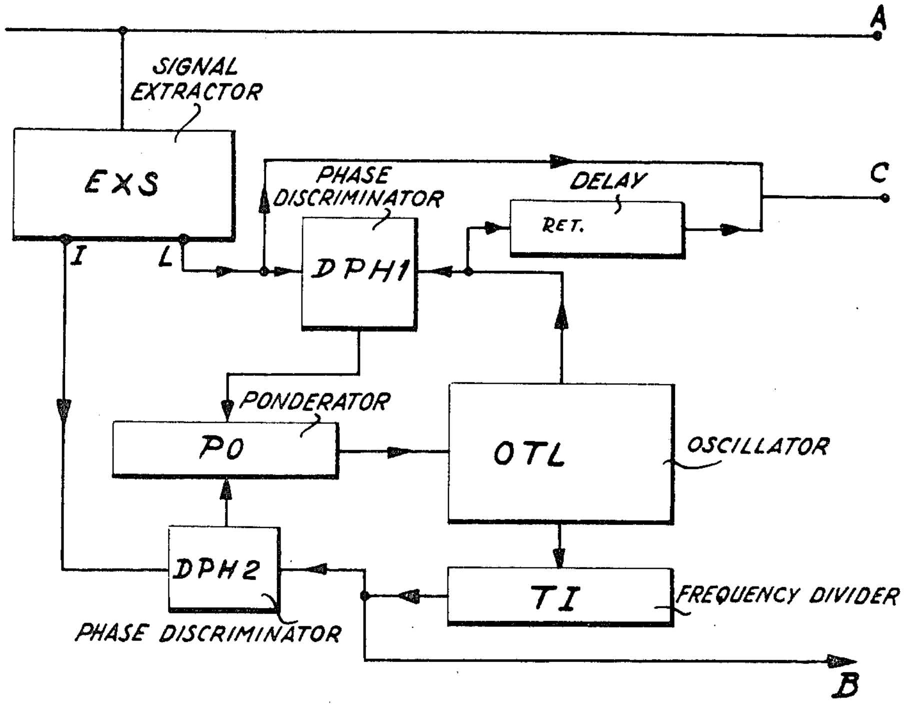
FIG. 9 shows a receiver system.

FIG. 9 shows a first embodiment of the deciphering system at the reception. The assembly of FIG. 9 is in fact substituted for the block SLS in FIG. 8 and the points A, C and B are connected as shown. The ciphering system is replaced by a corresponding deciphering system.

The ciphered signals and the line and frame sync pulses in clear are delivered at A. A synchronizing signal extractor EXS extracts therefrom the line sync signals at L and the frame sync signals at I.

The output L is connected to a first phase discriminator $DPH_1$, the output I to a second phase discriminator $DPH_2$.

A local oscillator OTL at the line signal frequency is connected by a delay line RET to terminal C, connected to the second input of the discriminator $DPH_1$. A frequency divider TI, controlled by the oscillator OTL supplies to the terminal B field synchronizing signals, and is connected to a second input of the phase discriminator $DPH_2$.

A "ponderator" circuit PO to be described later receives the output voltages from discriminators $DPH_1$ and $DPH_2$ and forms an error voltage supplied to the oscillator OTL.

The operation of the assembly is as follows:

The oscillator OTL has its frequency controlled by the line synchronizing signals, as long as the frame synchronizing signals received and those generated by the divider TI very nearly coincide. When the latter depart from coincidence, the frame synchronizing signals are affected, due to the action of circuit PO.

Figure 10:
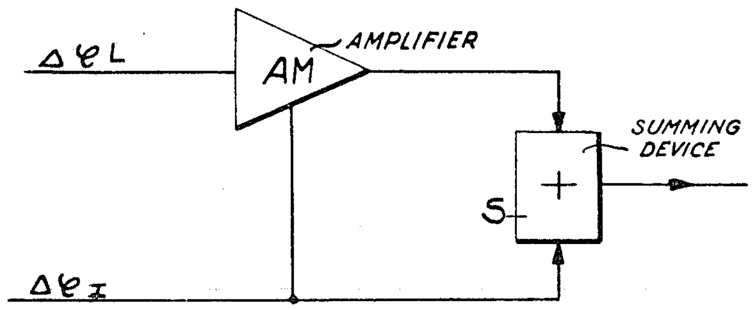
FIG. 10 is a detail of the arrangement of FIG. 9.

FIG. 10 shows an embodiment of the circuit PO. The latter, as shown in FIG. 10, comprises a controlled gain amplifier AM. It receives, at its input connected to discriminator $DPH_1$, the output signal $\Delta\phi_L$ of the latter and, at its gain control input connected to discriminator $DPH_2$, the output signal $\Delta\phi_I$ of the latter. A summing circuit summates the voltages $\Delta\phi_I$ and $G\Delta\phi_L$, G being the gain of the amplifier.

Figure 11:
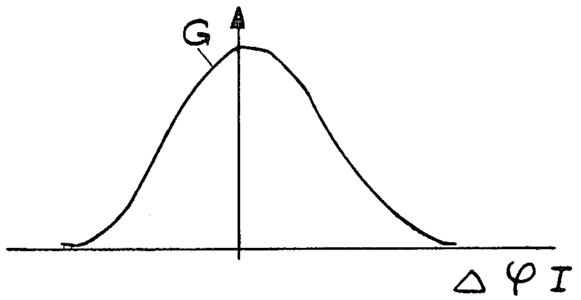
FIG. 11 is an explanatory curve.

The curve in FIG. 11 shows G as a function of $\Delta\phi_I$; the gain G is a maximum when $\Delta\phi_I$ is low, then decreases if $\Delta\phi_I$ increases. In other words, when $\Delta\phi_I$ is sufficiently great, gain G becomes zero and the control is effected by the frame synchronization signal. In the opposite case, it is effected by the line synchronization signal.

When the connection operates correctly, the clock at the receiving end is released by the received line synchronizing signals and the transmission key is automatically in phase with the reception key. If a line signal is badly received, the reception key is released by the synchronizing signal generated by the oscillator OTL and advances P steps per line, as the transmission key. If the shift between the received and local signals is small, the comparator $DPH_1$ restores the coincidence. The transmission and reception keys are then in phase, because they have advanced through the same number of steps per line.

For a greater deviation between the received and local signals, the reception key is triggered only by the local line and frame synchronizing signals and advances NP points per image. The phase discriminator $DPH_2$ restores the received and local line and frame synchronizing signals to coincidence. At this instant, the two keys are in phase, provided that the original dephasing is less than half a frame.

Figure 12:
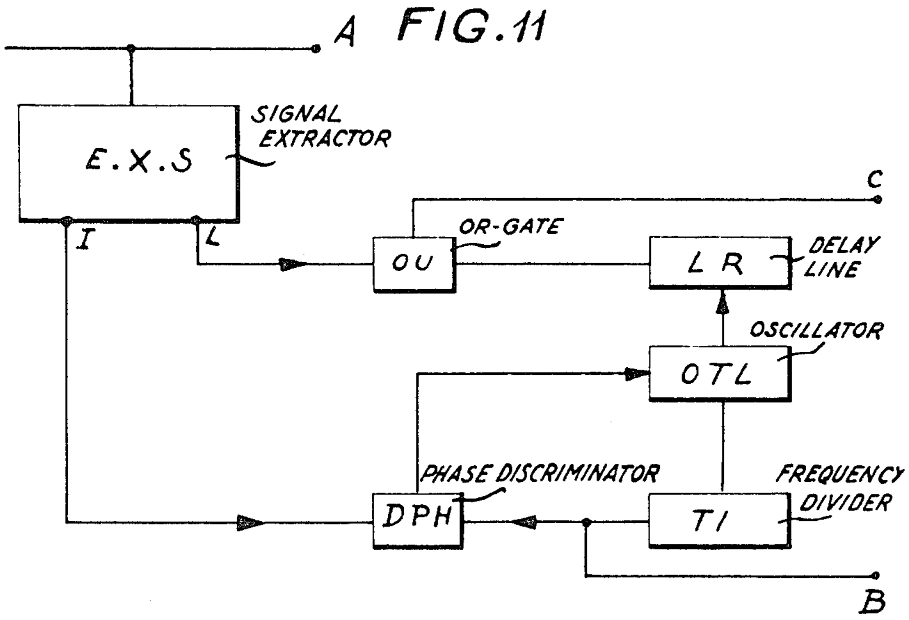
FIG. 12 is a further receiver system.

FIG. 12 shows another receiver arrangement according to the invention. In this drawing, the same reference designate the same elements as in FIG. 9. There is only one phase discriminator DPH which receives the local and transmitted frame synchronizing signals. This discriminator controls the oscillator OTL which is thus controlled to operate at the line frequency. The local line synchronizing signals are retarded by a delay line LR, which supplies an OR-circuit OU whose other input is connected to the output L of the circuit EXS and it output to the terminal C. The local line sync pulses are thus slightly delayed at the input of the OR-circuit so that, if a line sync pulse is not received through the connection link, the slightly delayed local sync pulse releases the receiver clock. At the end of N advances caused by the local line sync pulses, the counter CN is reset to zero. The operation is as described with reference to FIG. 9. The connection link functions whatever the hazards of the transmission. The failure of one line at the reception will not interfere with the unit.

It should be noted that, due to the duration of the frame synchronizing signals, any delay by the reception clock is made good, so that at the start of a frame transmission the two clocks are always in phase.

Of course, the invention is not limited to the embodiments described and shown which were given solely by way of example.

I claim:

1. An arrangement for secret transmission of messages consisting of cyclically repeated sequences during which an information is transmitted alternating with fixed duration dead times serving as a reference comprising:

means for generating a dead time signal at the end of each of said sequences:

a ciphering system having respectively first and second inputs for receiving said message and said signal, and in said ciphering system : means coupled to said second input responsive to said signal for generating a characteristic signal during said dead times;

a clock having a triggering input coupled to said second input, for receiving said dead time signal for providing a predetermined number of pulses;

a key generator controlled by said clock, having an output;

a ciphering device having a first input coupled to said output of said key generator and a second input coupled to said first input of said ciphering system, and an output;

a switch having a first input coupled to said characteristic signal generating means, for receiving said characteristic signal, a second input coupled to said output of said ciphering device, and an output ; and means controlled by said clock, for alternately connecting said last mentioned output to said first and to said second input of said switch.

2. An arrangement, as claimed in claim 1, further comprising means for sampling and quantizing said message, said means being coupled between said first input of said ciphering system and said ciphering device, for producing successive sequences of pulses in synchronism with said clock.

3. A secrecy facsimile transmission system comprising:

photoelectric means having an output for transducing successively into electric signals the lines of an image;

means having an output for delivering a signal at the end of each line;

a coding system;

in said coding system a generator having an input for receiving said end line signal and delivering in response thereto a characteristic pulse sequence;

means for sampling and quantizing said electric signals, for obtaining successive sequences of n pulses, at a predetermined frequency, n being a predetermined integer;

a clock having a triggering input for receiving said end line signals, and generating, after each triggering, n pulses in synchronism with said pulses of said sequences of n pulses;

a key generator controlled by said clock and having an output;

a ciphering system coupled to said key generator, having an input for receiving said sequences of $n$ pulses, and an output;

a switch controlled by said clock and having two inputs respectively connected to said characteristic signal generator, and to said output of said ciphering system.

4. A system for decoding television signals comprising coded picture signals and line and field synchronizing signals in clear, said system comprising:

an input for receiving said signals;

a signal extractor coupled to said input and having two outputs for delivering respectively said line and field synchronization pulses;

a first and a second phase discriminator having first inputs, respectively coupled to said outputs of said signal extractor circuit, second respective inputs, and respective outputs, a ponderator circuit having two inputs respectively coupled to said respective outputs of said phase discriminators, and an output;

a local oscillator having a frequency equal to the line synchronization signal frequency, having a control input connected to said output of said ponderator, a first and a second output;

a frequency divider coupled to said first output of said oscillator to provide signals at said field frequency, said divider having an output coupled to said second input of said second discriminator;

a clock connected to said output of said extractor delivering line pulses, and to said output of said delay line;

a key generator controlled by said clock: and a deciphering device coupled to said input and said key generator.

5. A system as claimed in claim 4 wherein said ponderator comprises a controlled gain amplifier, having an input connected to one of said inputs of said ponderator, a control input coupled to the other one of said inputs of said ponderator, and an output ; a summing device having a first input coupled to said output of said amplifier ; a second input coupled to said other one of said inputs of said ponderator, and an output.

* * * * *